United States Patent [19]

Sakamoto et al.

[11] Patent Number: 5,142,922
[45] Date of Patent: Sep. 1, 1992

[54] IMPACT SENSING APPARATUS

[75] Inventors: Kazunori Sakamoto, Toyota; Atsushi Onoda, Nagoya, both of Japan

[73] Assignees: Aisin Seiki Kabushiki Kaisha; Toyota Jidosha Kabushiki Kaisha, both of Aichi, Japan

[21] Appl. No.: 673,676

[22] Filed: Mar. 22, 1991

[30]  Foreign Application Priority Data

Mar. 27, 1990 [JP]  Japan ............................ 2-32380[U]

[51] Int. Cl.$^5$ ............................................ G05G 17/00
[52] U.S. Cl. ........................................ 74/2; 102/252; 180/282; 280/734
[58] Field of Search ............ 74/2; 102/252; 137/45; 200/61.48, 61.5; 280/734, 737; 180/282

[56]  References Cited

U.S. PATENT DOCUMENTS

| 2,871,310 | 1/1959 | Porcheddu | 200/61.48 X |
| 3,965,917 | 6/1976 | Speck | 137/38 |
| 4,742,839 | 5/1988 | Stock | 137/38 |
| 4,927,172 | 5/1990 | Motozawa | 280/734 |
| 5,024,157 | 6/1991 | Nishikawa | 102/252 |

FOREIGN PATENT DOCUMENTS

| 109863 | 8/1980 | Japan | 137/45 |
| 60-24855 | 12/1985 | Japan . | |
| 60-248454 | 12/1985 | Japan . | |
| 60-248456 | 12/1985 | Japan . | |
| 60-248457 | 12/1985 | Japan . | |
| 1-171764 | 12/1989 | Japan . | |
| 2-32464 | 2/1990 | Japan . | |
| 2-76557 | 6/1990 | Japan . | |
| 2-76558 | 6/1990 | Japan . | |
| 2-105058 | 8/1990 | Japan . | |

*Primary Examiner*—Allan D. Herrmann
*Attorney, Agent, or Firm*—Finnegan, Henderson, Farabow, Garrett and Dunner

[57]  ABSTRACT

An impact sensing apparatus includes a housing, a weight freely rotatably and movably supported within the housing at a position offset from the centroid of the weight, a firing lever pivotally supported on the housing for engaging the weight, and a spring stretched between the housing and the firing member for constantly biasing the firing member in a direction which engages it with the weight. The weight is held at a predetermined position, though its engagement with the firing pin, owing to the biasing force of the spring. When the apparatus is subjected to a prescribed acceleration under these conditions, the weight moves and rotates against the biasing force of the spring, thereby disengaging the firing pin and allowing it to turn. Erroneous operation ascribable to small, momentary shocks, as when a vehicle is traveling on a bumpy road, is prevented.

3 Claims, 2 Drawing Sheets

IMPACT SENSING APPARATUS

BACKGROUND OF THE INVENTION

1. Field of the Invention

This invention relates to an impact sensing apparatus used as a sensor for starting the operation of a safety system such as an airbag or seat-belt tensioner to protect against impact.

2. Description of the Prior Art

A known example of a conventional shock sensing apparatus of this kind is disclosed in the specification of Japanese Patent Application Laid-Open (KOKAI) No. 60-248456. The apparatus includes a sensing cone the movement of which causes a rod to be urged and turned against the biasing force of a spring. Owing to the turning motion of the rod, a rotary shaft is rotated to disengage the rotary shaft from a firing pin, thereby allowing an output member to be moved by the biasing force of the spring.

With an impact sensing apparatus of this type, the damper effect of a fluid in a clearance between the sensing cone and a housing is utilized to prevent erroneous operation in such a manner that shocks sustained for extremely small periods of time, as when a vehicle is traveling on a bumpy road, will not actuate the impact sensing apparatus. A problem encountered in this arrangement is that the characteristics thereof change due to such conditions as a change in temperature, as a result of which stable operating performance cannot always be obtained.

SUMMARY OF THE INVENTION

Accordingly, an object of the present invention is to provide an impact sensing apparatus in which erroneous operation can be prevented while a stable operating performance is maintained at all times irrespective of such conditions as a change in temperature.

According to the present invention, the foregoing object is attained by providing an impact sensing apparatus comprising a housing, a weight freely rotatably and movably supported within the housing at a position offset from a centroid position of the weight, an output member pivotally supported on the housing for engaging the weight, and a spring stretched between the housing and the output member for constantly biasing the output member in a direction which engages it with the weight.

In operation, the weight is held at a predetermined position at all times, via engagement thereof with the output member, owing to the biasing force of the spring. When the apparatus is subjected to acceleration under these conditions, the weight moves and rotates against the biasing force of the spring, as a result of which the output member and the weight disengage and the output member is actuated (turned). Thus, a damper effect is obtained owing to the biasing force of the spring and an inertial moment produced by offsetting the rotational center of the weight from its centroid. Owing to the damper effect, erroneous operation ascribable to shocks sustained for extremely small periods of time, as when a vehicle is traveling on a bumpy road, is prevented. This assures stable operation at all times without a change in characteristics caused by such conditions as a change in temperature.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of the present invention will now be described in detail with reference to the accompanying drawings.

Figure 1:
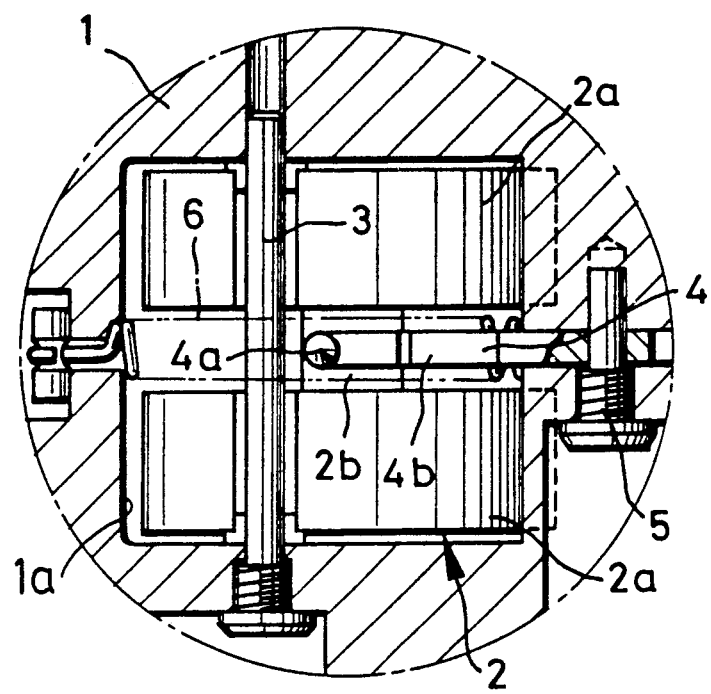
FIG. 1 is a transverse sectional view illustrating an impact sensing apparatus according to the present invention.
Figure 2:
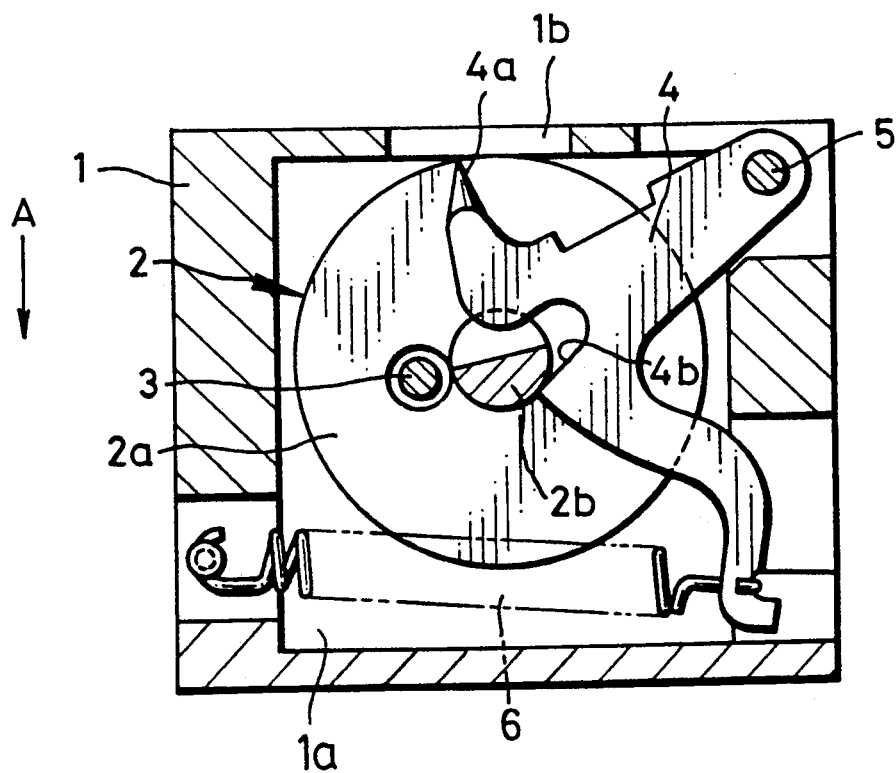
FIG. 2 is a longitudinal sectional view of the impact sensing apparatus.

As shown in FIGS. 1 and 2, an impact sensing apparatus according to the present invention includes a housing 1 within which a weight 2 is disposed. The weight 2 comprises a pair of disk-shaped large-diameter portions 2a, and a semicircular cam portion 2b formed between the large-diameter portions 2a. The housing 1 is formed to have a groove or cavity portion 1a. The weight 2 is supported by a pin 3 at a position offset from the centroid of the weight and is capable of rotating clockwise in FIG. 2 and of moving downwardly in the cavity 1a as viewed in FIG. 2.

A firing lever 4 having a firing pin 4a is pivotally supported on the housing 1 by a pin 5. A spring 6 is stretched between the firing lever 4 and the housing 1 and constantly biases the firing lever 4 clockwise in FIG. 2 so that the firing pin 4a is urged at all times in a direction that will allow it to be thrust out from a window 1b formed in the housing 1. The firing lever 4 is formed to have an engaging portion 4b for engaging with and disengaging from the cam portion 2b of the weight 2. Owing to engagement between the cam portion 2a and engaging portion 2b, clockwise rotation (in FIG. 2) of the firing lever 4 under the biasing force of the spring 6 is limited, and so are counter-clockwise rotation and downward movement (both in FIG. 2) of the weight 2. (Essentially, movement of the weight 2 is limited by the biasing force of the spring 6.)

Figure 3:
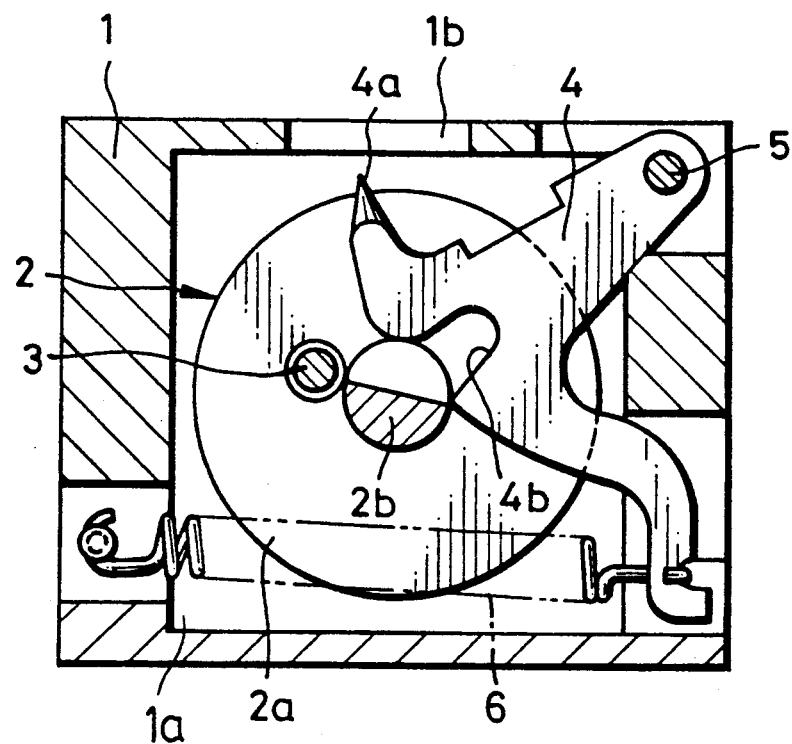
FIGS. 3 and 4 are longitudinal views corresponding to FIG. 2 and showing operating states of the impact sensing apparatus.
Figure 4:
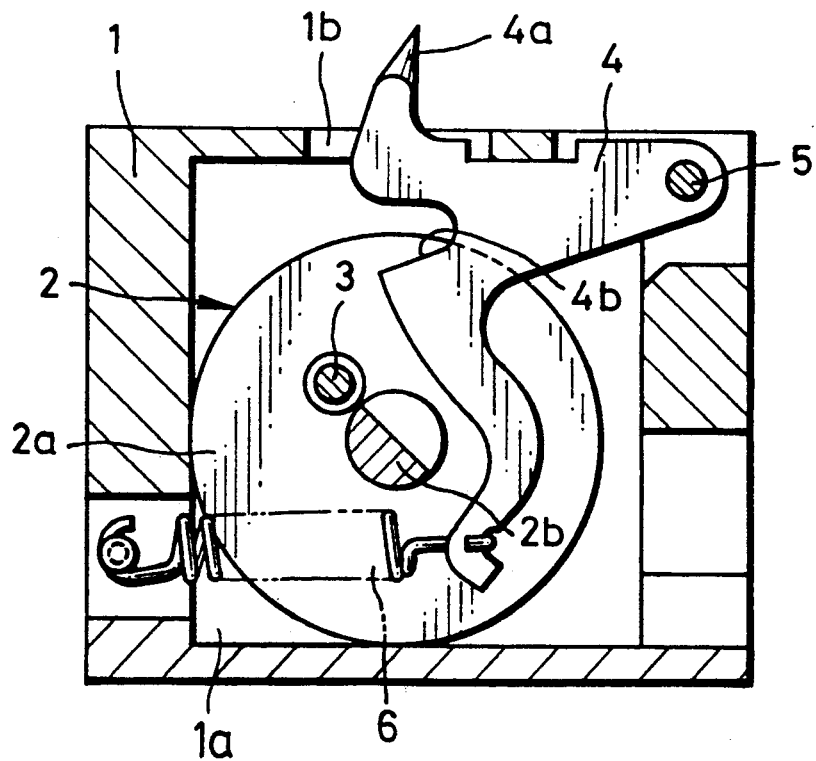

In operation, assume that acceleration (impact) having a predetermined magnitude in direction A and a duration greater than a predetermined period of time acts upon the apparatus when the state shown in FIG. 2 prevails. In response to such impact, the weight 2 rotates clockwise and moves downwardly while turning the firing lever 4 counter-clockwise against the biasing force of the spring 6, as shown in FIG. 3. Owing to the turning motion of the weight 2, the cam portion 2 of the weight and the engaging portion 4b of the firing lever disengage. As a result, the firing lever 4 is turned clockwise by the biasing force of the spring 6, as shown in FIG. 4, so that the firing pin 4a is thrust out of the window 1b. This outward thrusting motion of the firing pin 4a takes place only if the applied acceleration has a predetermined magnitude and lasts in excess of a predetermined period of time. If the acceleration does not satisfy these conditions, i.e., if impact is only momentary, namely of an extremely short duration, the acceleration is absorbed by the biasing force of the spring 6 and the inertial moment of the weight 2. In other words, the spring 6 and weight 2 provide a damper effect. This makes it possible to prevent erroneous operation.

Thus, since the damper effect is obtained by virtue of the biasing force of spring 6 and the inertial moment produced by offsetting of the weight 2, stable operation at all times is assured without a change in characteristics caused by such conditions as a change in temperature. In addition, since there are few component parts, the weight 2 can be made large in size, thereby furnishing high resolution of sensible acceleration and making it possible to enlarge the energy with which the firing pin 4a is thrust out of the window 1b. Furthermore, the dimensional precision of the apparatus is easier to manage in comparison with the prior art, greater reliability is achieved and cost is reduced significantly.

The value of acceleration capable of being sensed can be changed with ease by changing the biasing force of the spring 6 and the amount of offset of the weight 2. In addition, two sets of the impact absorbing apparatus described above can be arranged to have point symmetry. The input of an inertial load in a case where the two sets of apparatus are installed in a steering wheel pad or the like is equalized to the maximum extent and redundancy is enhanced.

Owing to the construction of the invention described above, erroneous operation caused by momentary shock as when a vehicle is traveling on a bad road can be prevented by virtue of the biasing force of the spring and the inertial moment produced by offsetting the center of rotation of the weight from its centroid. This makes it possible to achieve stable operating performance at all times without any change in characteristics due to such conditions as a change in temperature. Since the component parts are few in number, the weight can be made large in size. As a result, the resolution of sensible acceleration can be raised and the thrusting energy of the firing lever can be enlarged. Furthermore, the dimensional precision of the apparatus is easier to manage in comparison with the prior art, greater reliability is achieved and cost is reduced significantly.

As many apparently widely different embodiments of the present invention can be made without departing from the spirit and scope thereof, it is to be understood that the invention is not limited to the specific embodiments thereof except as defined in the appended claims.

What is claimed is:

1. An impact sensing apparatus comprising:
   a housing;
   a weight having a disk-shaped main portion with a centroid and center of gravity, said weight being freely rotatably and movably supported within said housing about an axis offset from the position of said centroid and said center of gravity, said weight having a semicircular cam surface portion rotatable with and revolvable about the offset axis of the weight;
   a firing lever pivotally supported on said housing for engaging said cam surface portion of said weight; and
   a spring stretched between said housing and the firing lever for constantly biasing said firing lever in a direction engaging the firing lever with said cam surface portion of said weight;
   said cam surface portion being rotatable and revolvable about said offset axis to move the firing lever during rotation in a direction opposite the biasing direction to disengage said cam surface portion from an engaging portion of the firing lever, said firing lever having a pin portion projecting from said housing in response to an impact in excess of a predetermined magnitude exerted upon said weight.

2. An impact sensing apparatus comprising:
   a housing;
   a weight having a center of gravity, said weight being freely rotatably and movably supported within said housing at a position offset from the position of said center of gravity;
   a firing lever for engaging said weight said firing lever having a firing pin portion pivotally supported on said housing for engaging said weight; and
   a spring stretched between said housing and the firing lever for constantly biasing said firing lever in a direction for engaging the firing lever with said weight;
   said weight including a pair of disk-shaped main portions and a semicircular cam portion between said main portions, said firing lever having an engaging portion engageable with the cam portion of said weight.

3. An impact sensing apparatus according to claim 2 wherein said weight is rotatable for disengagement between said cam portion and said engaging portion to project the firing pin portion from said housing in response to an impact load in excess of predetermined magnitude being exerted upon said weight.

* * * * *

UNITED STATES PATENT AND TRADEMARK OFFICE
CERTIFICATE OF CORRECTION

PATENT NO. : 5,142,922

DATED : September 1, 1992

INVENTOR(S) : Kazunori Sakamoto et al.

It is certified that error appears in the above-identified patent and that said Letters Patent is hereby corrected as shown below:

Claim 2, column 4, line 31, after "weight", insert a comma (--,--).

Title page, Abstract, line 9, "though" should read --through--.

Signed and Sealed this

Nineteenth Day of October, 1993

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,142,922

DATED : September 1, 1992

INVENTOR(S) : Kazunori Sakamoto et al.

It is certified that error appears in the above-identified patent and that said Letters Patent is hereby corrected as shown below:

On title page, Item 21 change Application No. "673,676"

to --673,376--.

Signed and Sealed this

Twenty-eighth Day of December, 1993

Attest:

BRUCE LEHMAN

Attesting Officer

Commissioner of Patents and Trademarks